United States Patent [19]
Pauty

[11] 4,065,811
[45] Dec. 27, 1977

[54] DOMESTIC APPLIANCE FOR CONDITIONG FOOD SUCH AS SALADS

[75] Inventor: Bernard Pauty, Daix-Fontaine-les-Dijon, France

[73] Assignee: Seb S.A., Selongey, France

[21] Appl. No.: 738,178

[22] Filed: Nov. 2, 1976

[30] Foreign Application Priority Data

Nov. 25, 1975 France .................................. 75.35953

[51] Int. Cl.[2] .............................................. B01F 7/30
[52] U.S. Cl. .................................. 366/244; 366/287; 366/325
[58] Field of Search ............... 259/118, 119, 120, 121, 259/122, 116, 84, 85, 82, 57, 58, 102, 99, 107, 108, 105; 68/4, 132, 137, 23.3, 23.6; 99/348; 210/361, 380 L; 233/3, 6, 7

[56] References Cited

U.S. PATENT DOCUMENTS

| | | | |
|---|---|---|---|
| 1,612,281 | 12/1926 | Goetz | 259/118 |
| 1,995,926 | 3/1935 | Kirby | 68/132 |
| 2,148,399 | 2/1939 | Crissey | 259/118 |
| 2,525,585 | 10/1950 | Brasington | 259/85 |

*Primary Examiner*—Robert W. Jenkins
*Attorney, Agent, or Firm*—Young & Thompson

[57] ABSTRACT

The appliance comprises a spin-drying unit composed of a removable drying basket placed within a container and driven in rotation by a lid-plate fitted with a hand crank, the basket and the container being provided with central pivotal means, and a mixing unit which is at least partially removable. A system including a countershaft having two pinions provides a mechanical coupling between the units and the hand crank so that either a drying basket or a mixing whisk can be fitted in position according to requirements.

21 Claims, 27 Drawing Figures

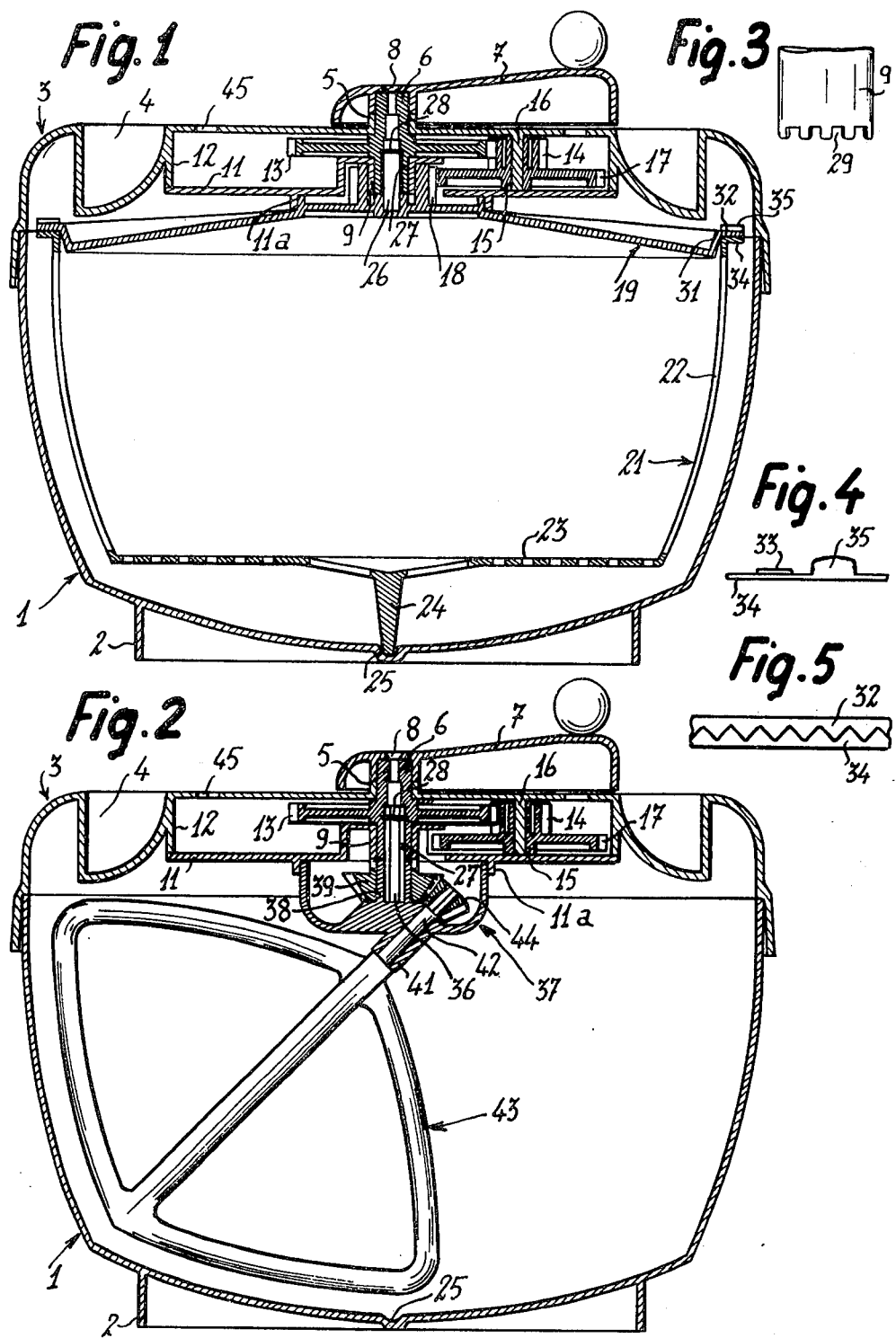

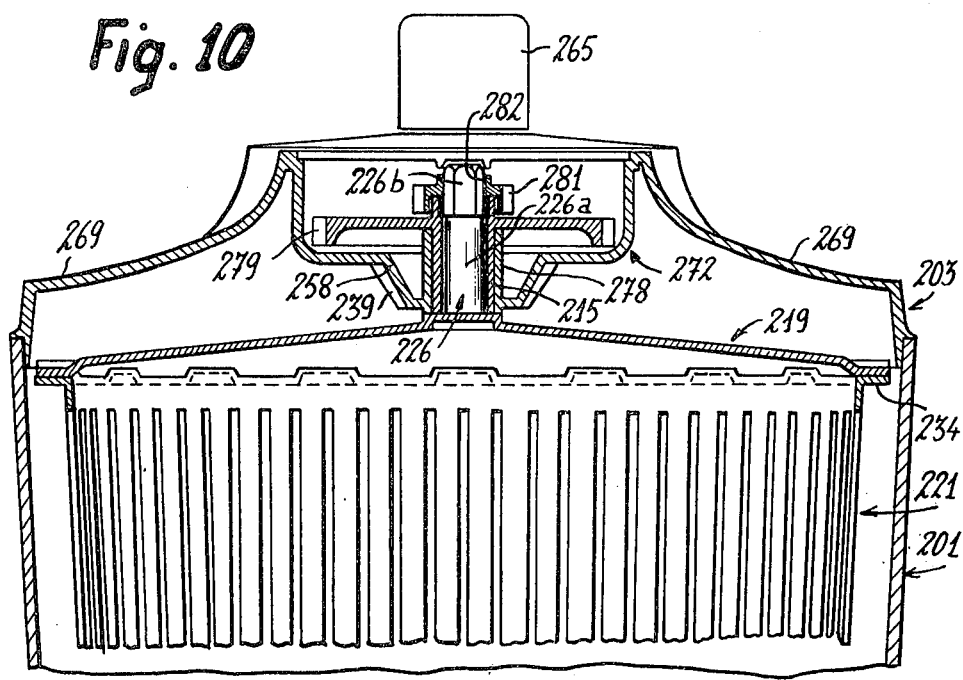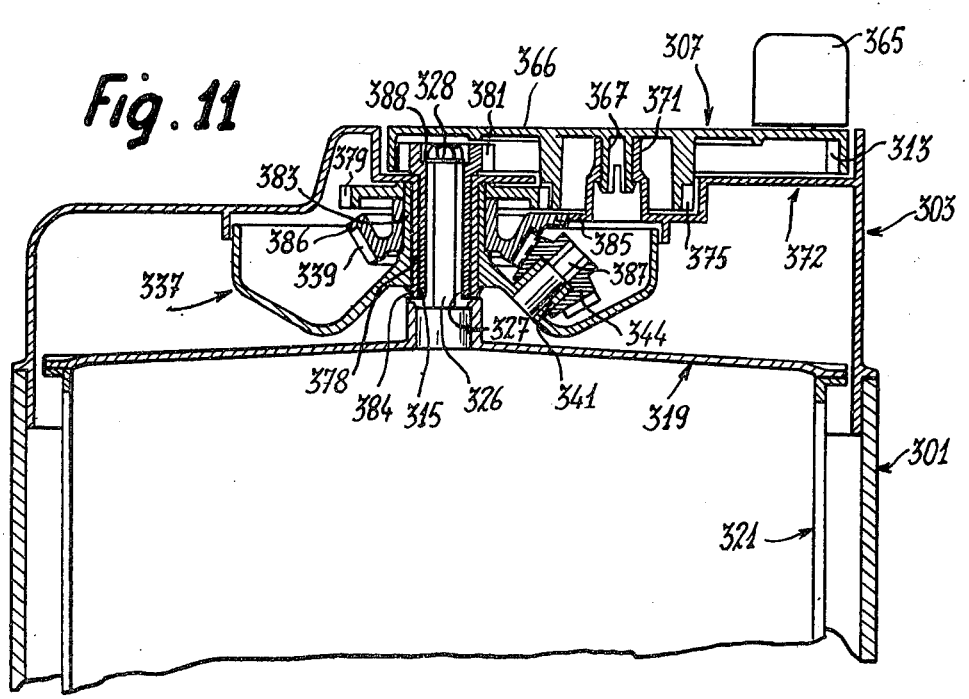

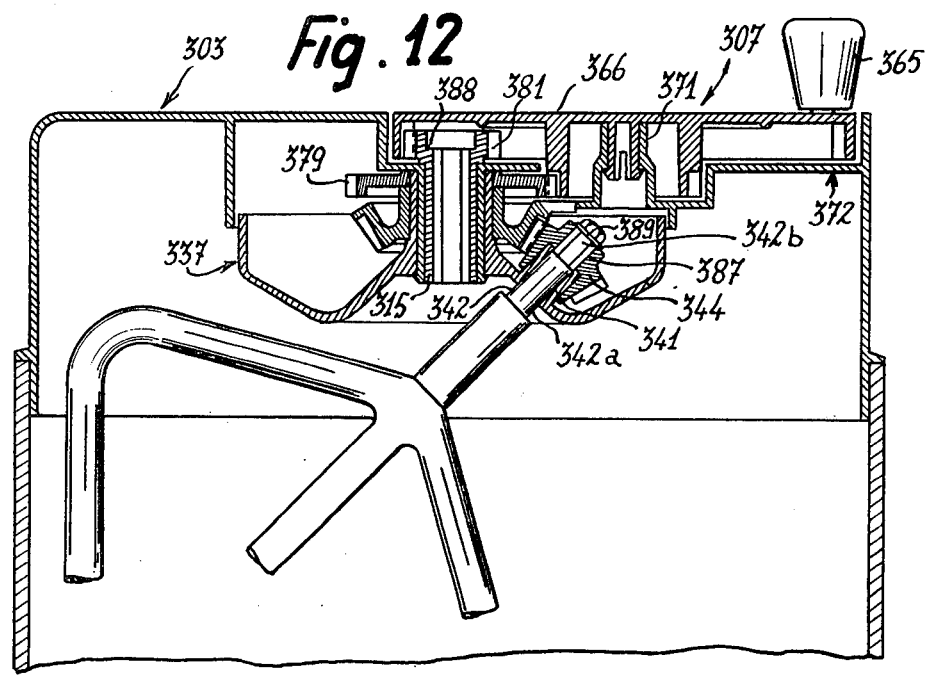
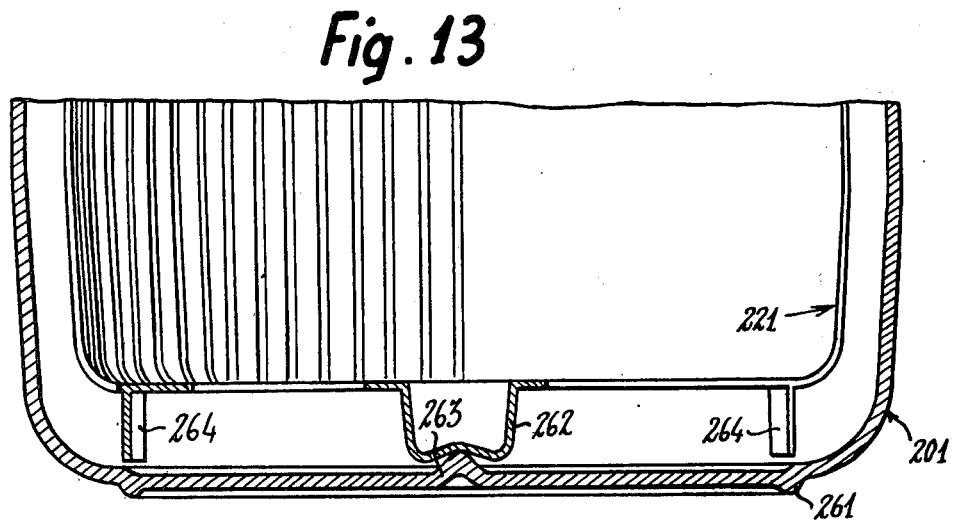
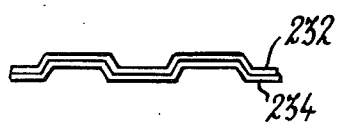

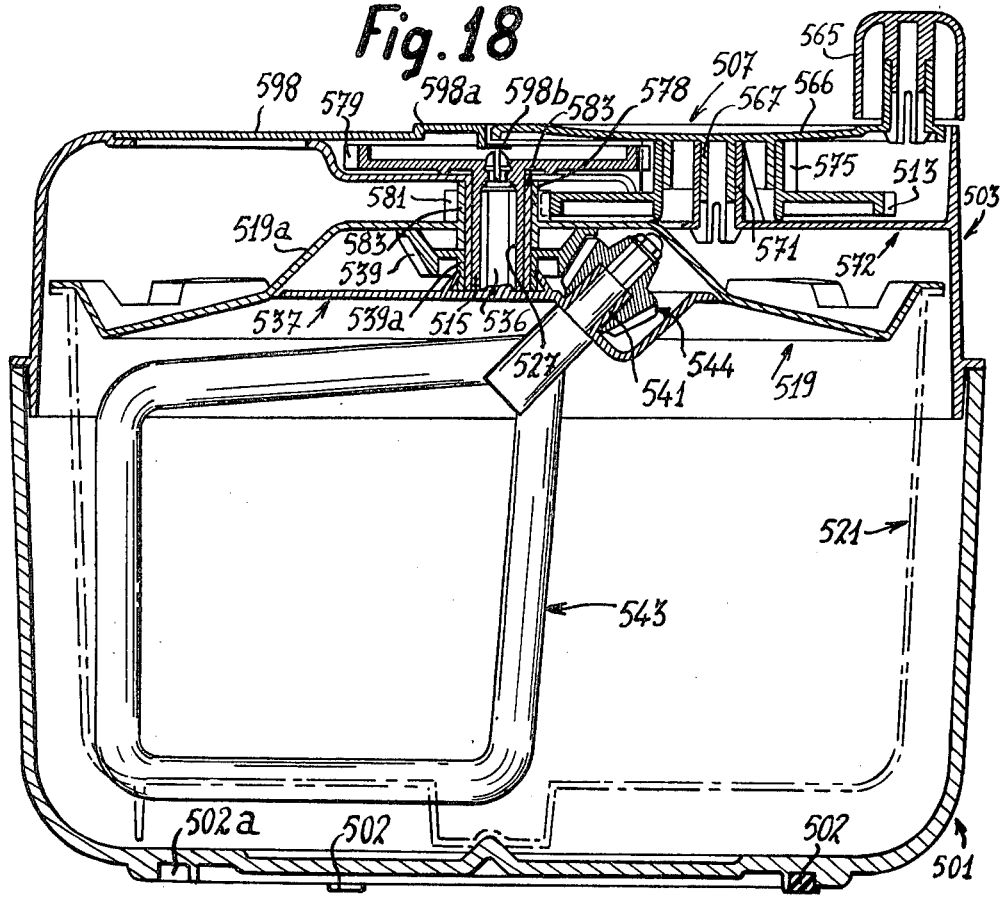
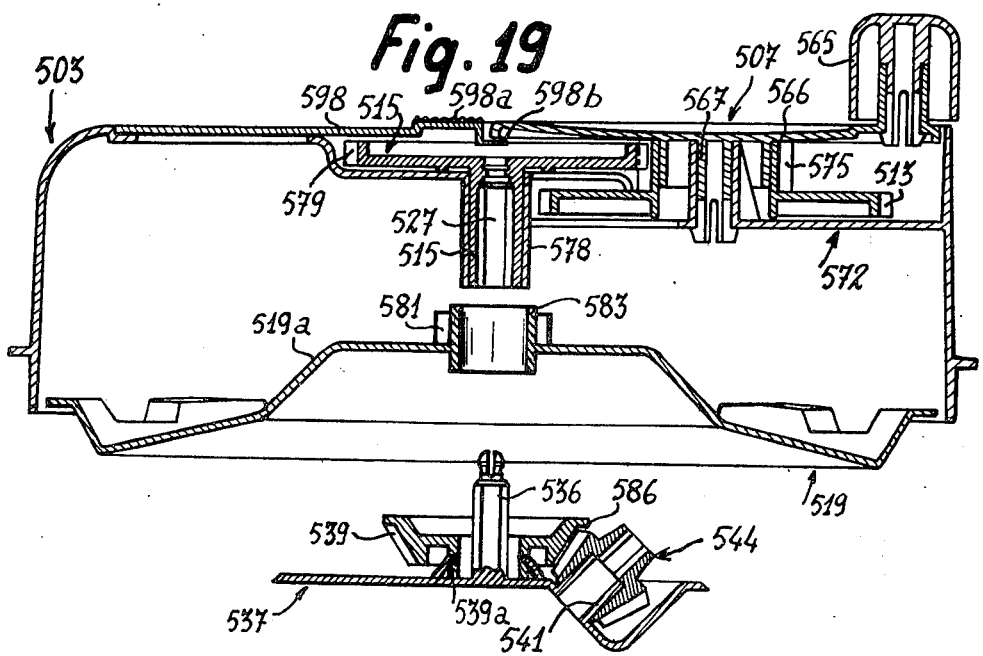

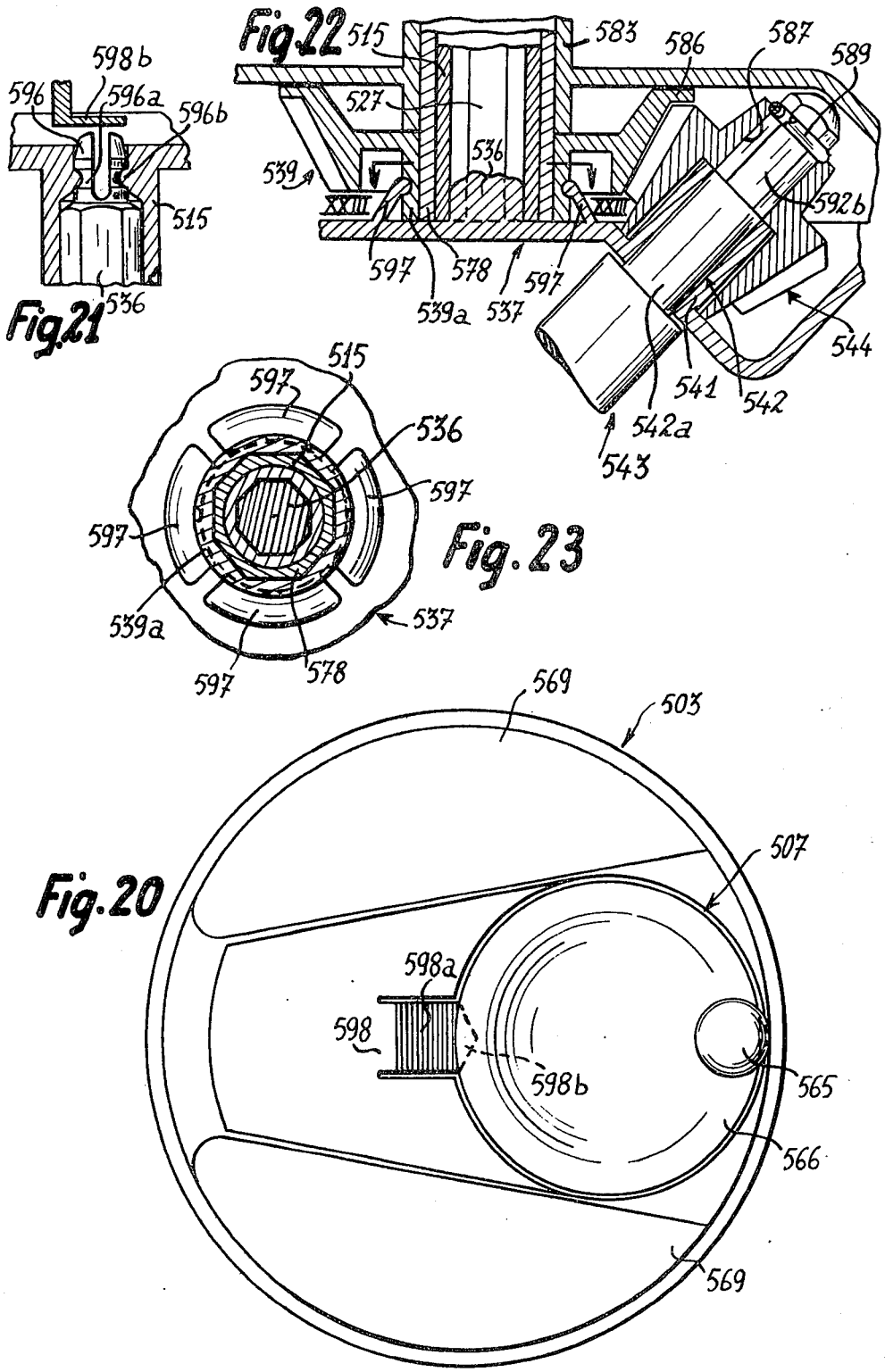

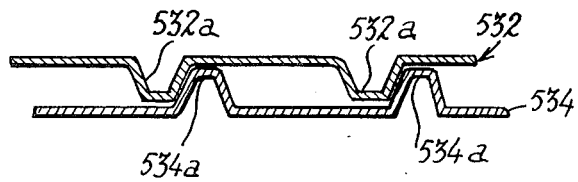
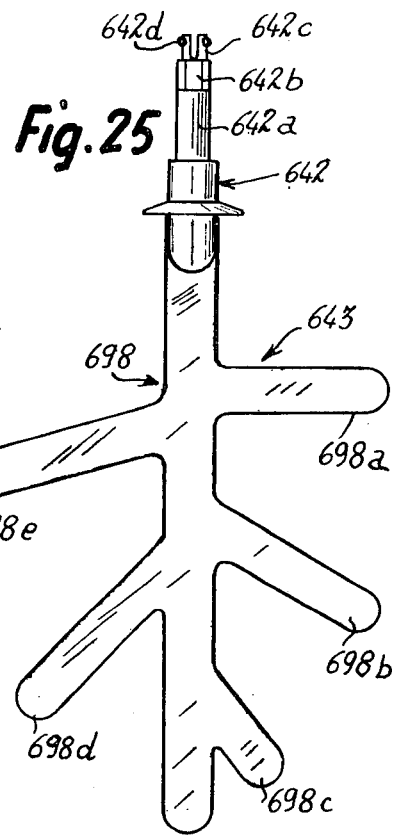
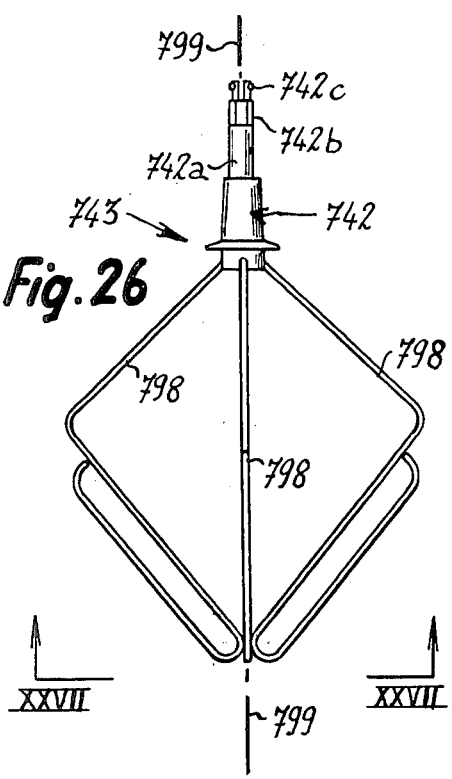
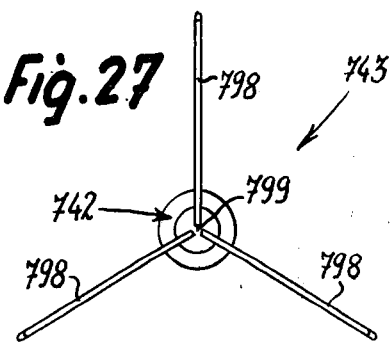

DOMESTIC APPLIANCE FOR CONDITIONG FOOD SUCH AS SALADS

This invention relates to a domestic appliance for conditioning food and especially food in the form of leaves such as salads.

It is known that, in order to prepare a salad and more especially a green salad, the vegetable usually has to be thoroughly washed with running water, the water retained in the folds of the leaves being then removed by shaking or spin-drying. The salad is then seasoned by mixing it with a sauce which has been prepared separately.

Spin-drying appliances or so-called "spinners" are already known. An appliance of this type consists of a container fitted with a lid and with a drying basket which is rotatably mounted within the container. A hand crank mounted on the lid makes it possible to drive the drying basket at high speed by means of suitable reduction-gearing, the output elements of which are engaged with the basket by means of a positive-clutch drive system. These appliances have been provided with a number of different improvements such as, for example, the mounting of the hand-crank shaft in an off-center position, thus making it easier to hold the appliance in position while it is in operation.

Mixing appliances constituted by a container and a lid are also known in which the essential component is a whisk formed of a bent rod having a shape which is similar to that of a parallelogram. The design of the whisk is such that it is capable of rotating about one of the diagonals of the parallelogram, said diagonal being intended at the same time to describe a cone within the container. It is a known practice to carry out this movement by means of a fixed bevel pinion which is coaxial with the appliance and disposed in meshing engagement with a pinion which is coaxial with the whisk. The planetary motion of the last-mentioned pinion thus achieves the desired result.

These appliances all suffer from a disadvantage in that they are of fairly large size and have substantial space requirements by reason of the low bulk density of raw salad in a loosely packed state. Furthermore, it has been seen that the preparation of a salad called for the successive use of two types of appliance as mentioned above, thus giving rise to problems of storage and cleaning which are practically doubled as well as the disadvantage of additional handling.

The aim of the present invention is to provide a single appliance which is capable of performing the two functions of spin-drying and mixing at the cost of a very simple adaptation of removable components.

In accordance with the invention, the domestic appliance for conditioning food and especially food in leaf form such as salads comprises a container fitted with a lid adapted to carry a driving hand-crank on which is keyed a toothed ring. The appliance essentially comprises in combination a spin-drying unit composed of a drying basket which is driven in rotation by a lid-plate, complementary pivotal means being provided respectively at the center of the basket and at the center of the container, and a mixing unit which is at least partially removable. The appliance further comprises means for providing a mechanical coupling between said units and the hand crank, said coupling means being such as to comprise in particular a countershaft having two pinions and being at least partially common to the two units.

The two functions are thus combined within a single appliance, thus simplifying the corresponding successive operations and appreciably reducing storage problems.

Preferably, the mixing unit comprises a whisk mounted for rotation about its axis and carried by a whisk support which is in turn rotatably mounted on the lid of the appliance, and the mechanical coupling means comprise a pinion keyed coaxially with the whisk and so arranged as to cooperate in planetary motion with a bevel pinion which is substantially coaxial with the appliance and fixed rotationally with respect to the lid in order to ensure both rotational motion of the whisk about its axis and rotational motion of said axis along a conical path.

In a first embodiment of the invention in which the axis of the hand crank coincides substantially with the axis of the appliance and in which both pinions of the countershaft are keyed on said shaft, the smaller of the two pinions meshes with the toothed ring of the hand crank and the larger of the two pinions meshes with a pinion which is rigidly fixed to the lid-plate said lid-plate being loosely mounted on the shaft of the hand crank. The lid-plate is locked axially and removably on the hand-crank shaft, the whisk support is removable and comprises means for coupling in rotation and axial locking with the hand crank, and the lid comprises means for locking the bevel pinion rotationally.

In this embodiment, the direction of rotation of the hand crank is unimportant and the speed of rotation of the mounted tool (drying basket or mixing whisk) is determined by the gear which is carried by the tool itself.

In a second embodiment of the invention, the axis of the hand-crank shaft again coincides substantially with the axis of the appliance but the lid-plate is stationarily mounted and comprises a pinion in mesh with the large pinion of the countershaft, the small pinion of said shaft being in mesh with the toothed ring of the hand crank. The lid-plate is provided with a cavity designed to carry an internal set of teeth which forms a bevel pinion and is intended to cooperate with the whisk pinion. The whisk support is removable and comprises means for rotational coupling with the handcrank shaft and means for axial locking in said shaft. The toothed ring of the hand crank is connected to its shaft by means of a one-way clutch device whereby the toothed ring and the shaft are made fast for rotation in one direction only. Furthermore, the large pinion of the countershaft is coupled with a stationary bearing by means of a second one-way clutch device which tends to lock said shaft in rotation when this latter tends to move in the same direction of rotation as that in which the hand-crank shaft is coupled with the toothed ring.

In this embodiment, the lid-plate which drives the basket remains permanently in the appliance, thus simplifying conversion operations. The speed of rotation of the respective spin-drying and mixing operations depends on the direction of rotation of the hand crank.

In a third embodiment of the invention, the hand crank is located off-center with respect to the axis of the appliance. Said crank is fitted with a second toothed ring having a diameter which is different from the first and these two toothed rings are so arranged as to cooperate with the countershaft pinions. The countershaft is substantially coaxial with the appliance and the bevel pinion is permanently fixed on the lid of the appliance, at least during normal operation.

This embodiment offers the advantage of smaller bulk of a mechanism in which the countershaft no longer takes up additional space. Moreover, the off-center position of the hand crank serves to provide on the lid a large available area for the user's hand in order to hold the appliance firmly in position during operation.

In a first variant of this embodiment, the whisk pinion is permanently fixed in the whisk support which is in turn permanently fixed on the lid of the appliance. The whisk is removable and comprises means for rotational coupling and for axial locking with said pinion. The lid-plate is rigidly fixed to the countershaft which is in turn rotationally coupled with the whisk support, the two pinions of the countershaft being keyed on said shaft. In addition, said shaft is mounted for axial sliding motion in order to selectively dispose one of said pinions in meshing engagement with one of the toothed rings of the hand crank, means for controlling said axial sliding motion being constituted by a leaf-spring which is secured to the lid and by the presence of the drying basket.

In this alternative form of construction, only the whisk proper and the drying basket constitute the interchangeable components. In addition, the mechanism is accordingly simplified.

In a second variant of the aforesaid embodiment, one of the pinions of the countershaft is loosely mounted on said shaft, the other pinion being keyed on said shaft. Furthermore, both pinions are continuously in mesh with the respective toothed rings of the hand crank.

In a preferred form of execution of this variant, the lid-plate is stationarily fitted in the lid of the appliance at least during normal service and is rigidly fixed to the pinion which is loosely mounted on the countershaft. At least under normal operating conditions, the whisk support is also attached to the lid of the appliance and rigidly fixed to the countershaft. The whisk is removable and its shaft is provided with means for rotational coupling and axial locking with the pinion of the whisk.

The only interchangeable parts in that case are the whisk and the drying basket, these latter being intended to be fixed on actuating members which are continuously engaged and in motion without requiring any manual operation for the conversion.

Further properties and advantages of the invention will become apparent from the following detailed description, reference being made to the accompanying drawings which are given by way of example without any limitation being implied, and in which:

FIG. 1 is a sectional view of a first embodiment of the invention in the spin-drier version;

FIG. 2 is a sectional view of the same embodiment in the mixer version;

FIGS. 3, 4 and 5 are views to a larger scale showing constructional details of the aforesaid embodiment;

FIGS. 9 and 10 are partial sectional views of a first variant of a third embodiment of the invention, respectively in the mixer version and in the spin-drier function;

FIGS. 11 and 12 are partial sectional views of a second variant of the preceding embodiment, respectively in the spin-drier version and in the mixer version;

FIG. 13 is a partial sectional view which is common to the two previous embodiments;

FIG. 14 is a view to a larger scale showing a constructional detail of the two previous variants;

FIG. 18 is a sectional view of a fifth embodiment of the invention in which the spin-drier version and the mixer version are shown in graphic superposition;

FIG. 19 is an exploded view corresponding to FIG. 18 and showing the possibilities of disassembly of the appliance;

FIG. 20 is a plan view of the same embodiment;

FIGS. 21 and 22 are views of details of FIG. 18 shown to a larger scale;

FIG. 23 is a fragmentary part-sectional view taken along line XXIII—XXIII of FIG. 22;

FIG. 24 is a partial cylindrical sectional view of the cooperating edges of the lid-plate and of the drying basket;

FIG. 25 is a view in elevation showing a first example of construction of the mixing whisk;

FIG. 26 is a view in elevation showing a second example of construction of the mixing whisk;

FIG. 27 is a view taken along line XXVII—XXVII of FIG. 26.

Figure 6:
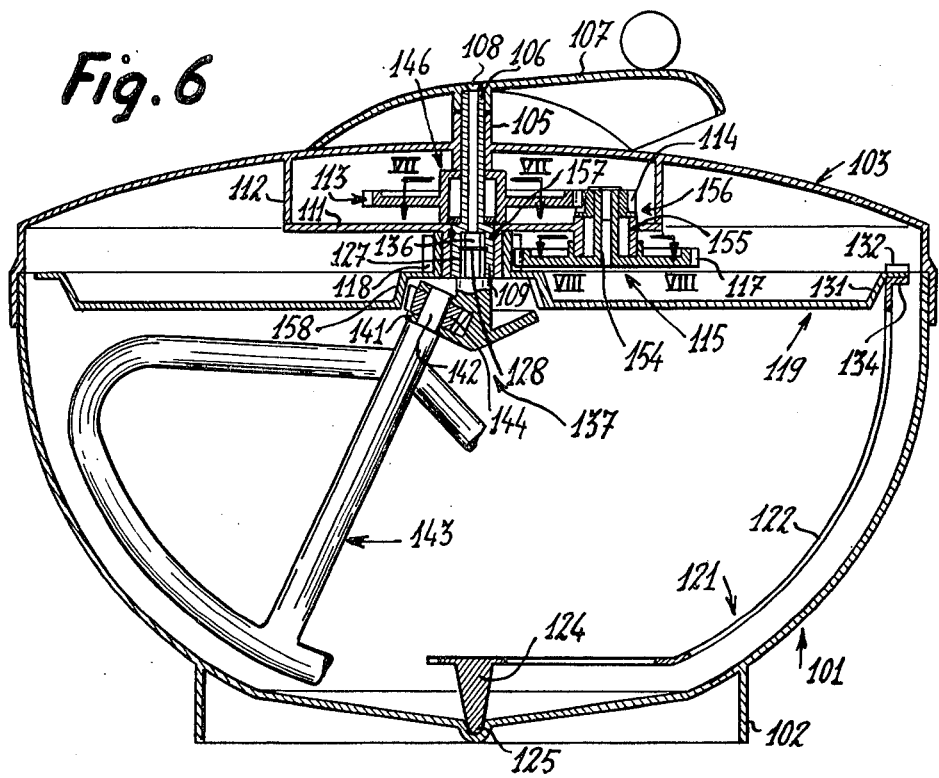
FIG. 6 is a sectional view of a second embodiment of the invention as shown partly in the spin-drier version and partly in the mixer version.

Referring to FIGS. 1 to 5, a first embodiment of an appliance in accordance with the invention comprises a container 1 which is designed to rest on a working surface by means of a bottom support 2. A lid 3 fits on to said container and is provided with a circular groove 4 so that said container 1 and lid 3 can thus be maintained in position when assembled together.

A bearing 5 which is coaxial with the lid 3 and integral with this latter carries a shaft 6 to which is fixed a hand crank 7 by means of a screw 8. The shaft 6 is also carried by a bearing 9 which is integral with a closure plate 11, said plate being attached to a circular spacer member 12 which forms part of the lid 3.

The shaft 6 carries a toothed ring 13 disposed in meshing engagement with a pinion 14 which is keyed on a countershaft 15. The shaft 15 is hollow and carried by a fixed or dead spindle 16 which is integral with the lid 3. Said shaft also carries a second pinion 17 which is keyed on this latter. The pitch diameter of the pinion 14 is distinctly smaller than those of the toothed ring 13 and of the pinion 17.

In the spin-drier version, the pinion 17 meshes with a pinion 18 which is coaxial with the appliance and rigidly fixed to a lid-plate 19 which is guided in rotation by a circular rib 11a of the plate 11 and adapted to drive a drying basket 21 in rotation by means which will hereinafter be described in detail. Slits 22 and holes 23 are formed in the basket 21 which is provided along its axis with a pivot 24, said pivot being adapted to cooperate with a complementary recess 25 formed in the container 1. The pinion 18 is hollow and rotatably mounted on the exterior of the bearing 9. An axial cylindrical stem 26 is carried by the lid-plate 19 at the center of this latter and engaged within a hexagonal cavity 27 of the shaft 6 of the hand crank 7, with the result that the lid-plate 19 is capable of rotating freely with respect to the shaft 6. An elastic ring 28 is permanently mounted in a groove of the hexagonal cavity 27 and cooperates with a groove formed in the stem 26 in order to ensure removable axial locking of the lid-plate 19 with respect to the shaft 6.

The bearing 9 is further provided at the lower end thereof with a cylindrical set of teeth 29 (as shown in FIG. 3) which does not engage with any other component in the spin-drier version under consideration.

In the example herein described, there is formed at the periphery of the lid-plate 19 a conical shouldered portion 31 which is designed to permit self-centering of the basket 21 with respect to said shouldered portion. The edge 32 of said lid-plate is cut-out so as to form a predetermined number of lugs 33 (as shown in FIG. 4) which are applied against a flange 34 of the basket 21. Bosses 35 corresponding in number to the lugs 33 are formed on said flange 34 and each have a cylindrical rounded portion with generating-lines which are substantially radial with respect to the appliance. It is understood that, by displacing the lid-plate 19 in rotational motion, the lugs 33 are abuttingly applied against the bosses 35 and thus impart rotational motion to the basket 21. If it should happen that the lugs 33 are applied directly against the bosses 35 when the appliance is put into service, said lugs skid readily over the cylindrical rounded portion in order to take up a suitable position.

By way of alternative, the respective edges 32 and 34 of the lid-plate 19 and of the drying basket 21 can have complementary saw-teeth (as shown in FIG. 5) for ensuring the cooperation of said edges. This arrangement has the further advantage of constituting a friction-clutch system.

Under operating conditions and after the basket 21 filled with food to be spin-dried has been placed within the container 1 and the pivot 24 has been positioned so as to coincide with the recess 25, the engagement of the lid 3 ensures coupling of the lid-plate 19 with the drying basket 21. By rotating the hand crank 7, the basket 21 is then caused to rotate at a high speed as a function of the remarks made earlier in connection with the gear ratios.

In order to convert the appliance to the mixer version, it is only necessary to remove the lid-plate 19 by disengaging this latter from the ring 28 as a result of axial traction. A complementary hexagonal rod 36 is then inserted into the hexagonal cavity 27 (as shown in FIG. 2), said rod being rigidly fixed to a whisk supports 37 which is intended to engage within the circular rib 11a for guiding in rotation. The whisk support 37 is thus rotatably coupled to the shaft 6 of the hand crank. Said support is also locked axially with said shaft by means of a groove formed in the rod 36 in order to cooperate with the ring 28.

The whisk support 37 has an axial sleeve 38 in which the rod 36 is fixed. Said sleeve is externally cylindrical and carries a bevel pinion 39 which is loosely mounted on said sleeve for free rotational motion. The bevel pinion 39 is provided with a cylindrical set of teeth which is complementary to the cylindrical set of teeth 29 of the bearing 9 and the dimensions of the components are such that, when the rod 36 is locked within the ring 28, said two sets of teeth are placed in cooperating relation so as to lock the bevel pinion 39 rotationally.

The whisk support 37 further comprises a bearing 41 which carries the shaft 42 of a whisk 43. A pinion 44 is keyed on said shaft 42 and meshes with the bevel pinion 39.

As can readily be understood, the drying basket 21 is removed in the mixer version.

During operation, the movement of rotation imparted to the hand crank 7 again produces a movement of rotation of the countershaft 15 but the pinion 17 is no longer is mesh with the pinion 18 since this latter has been withdrawn. On the other hand, by virtue of the cooperation of the hexagonal cavity 27 with the hexagonal rod 36, the whisk support 37 is driven in rotation at the same speed as the hand crank 7. The pinion 44 then runs in planetary motion around the bevel pinion 39 which is locked rotationally by the cylindrical sets of teeth, with the result that a double movement is imparted to the whisk 43, namely a movement of revolution about the axis of the appliance and a movement of rotation about its own axis.

Preferably, the ratio of the number of teeth of the pinions 39 and 44 is chosen so as to be different from a whole number in order to ensure that the whisk 43 does not come into the same position at the same point of two successive revolutions.

During operation as a mixer, no projection of seasoning is liable to move upwards as far as the mechanism except perhaps in a very limited quantity as a result of insufficient cooperation of the rib 11a with the whisk support 37. These projections are very readily eliminated once the whisk support 37 has been withdrawn. Washing water is discharged in addition from the space between the lid 3 and the closure plate 11 through the space which is normally occupied by the pinion 18 in the mixer version and through holes 35 formed in the lid 3.

Figure 7:
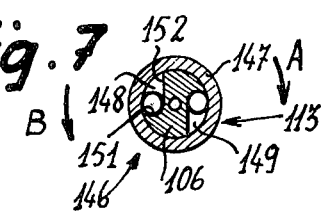
FIG. 7 is a partial sectional view taken along line VII—VII of FIG. 6.

Reference being made to FIGS. 6 and 7, a second embodiment of the invention will now be described. In FIG. 6, both the spin-drier and mixer versions are illustrated in partial superposition in order to show that the respective specific components of these two versions cannot be mounted simultaneously, thus preventing any errors of operation.

Reference being made to FIG. 6, the appliance comprises a container 101 provided with a bottom support 102 and covered with a fitted lid 103. In a bearing 105 which is integral with the lid 103, there is rotatably mounted a shaft 106 of a hand crank 107 which is secured to said shaft by means of a screw 108. The shaft 106 is also carried by a bearing 109 which is integral with a closure plate 111, said plate being fixed on a spacer member 112 which is integral with the lid 103. A toothed ring 113 is mounted on the shaft 106 by means of a one-way clutch device 146 (as shown in FIG. 7).

In accordance with this arrangement, the shaft 106 which is freely mounted for rotation within a sleeve 147 of the toothed ring 113 has two diametrically opposite longitudinal grooves 148, 149 which are provided (as shown in cross-section in FIG. 7) with a circular portion 151 and a flat portion 152. Within each groove, a roller 153 having the same diameter as the circular portion 151 is enclosed by the sleeve 147. It is apparent that, if the shaft 106 tends to rotate in the direction A, the roller 153 rotates within the circular portion 151 and the sleeve 147 is not driven in rotation. On the contrary, if the shaft 106 tends to rotate in the direction B, the roller 153 tends to jam between the sleeve 147 and the flat portion 152, with the result that the sleeve 147 and the shaft 106 are coupled for rotation.

Figure 8:
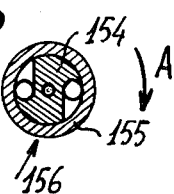
FIG. 8 is a partial sectional view taken along line VIII—VIII of FIG. 6.

The spindle 154 of a countershaft 115 is supported by a bearing 155 which is rigidly fixed to the plate 111, provision being made for a second one-way clutch device 156 which is similar in design to the preceding and operates in the same manner. Thus if the spindle 154 tends to rotate in the direction A (as shown in FIG. 8), it can do so freely but is locked in rotation as a result of coupling with the stationary bearing 155 if it tends to rotate in the direction B.

The countershaft 115 is provided with two pinions which are keyed on its spindle, namely a small pinion 114 disposed in meshing engagement with the toothed ring 113 and a large pinion 117 disposed in meshing engagement with a pinion 118 which is rigidly fixed to a lid-plate 119. As in the previous embodiment, the lid-plate 119 cooperates with a drying basket 121 provided with slits 122 and with a pivot 124 in cooperating relation with a recess 125 formed at the center of the base of the container 1, this cooperation being carried out by means of the respective edges 132 and 134 of the lid-plate 119 and of the basket 121. The lid-plate 119 also has a conical peripheral portion 131 for centering the basket 121.

The pinion 118 is mounted to rotate freely on the exterior of the bearing 109, a metal retaining ring 157 being provided so as to ensure permanent axial locking of said pinion.

The lid-plate 119 is further provided at its center with a concial boss 158 on which the pinion 118 is mounted (an which forms a cavity on the underside), said boss being provided internally with a conical set of teeth 139 which forms a bevel pinion, the function of which will be explained below.

In the spin-drier version, the appliance is limited to the assembly which has just been described in the foregoing.

During operation, the above-described action of the one-way clutch devices 146 and 156 is such that rotational displacement of the hand crank 107 in the direction B has the effect of driving the toothed ring 113 in the direction B. From this it follows that the rotational motion of the countershaft 115 tends to take place in the direction A and consequently that this rotational motion is free. The pinion 117 accordingly drives the lid-plate 119 in rotation at high speed by means of the pinion 118.

In order to change-over from the spin-drier version to the mixer version, it is only necessary to remove the drying basket 121 and to fit a mixing unit in position. This unit comprises a whisk support 137 fitted with a hexagonal-section stem 136 which engages within a complementary cavity 127 of the shaft 6 of the hand crank, axial locking being ensured by means of an elastic ring 128 as in the previous embodiment.

The whisk support 137 comprises a bearing 141 which carries the shaft 142 of a whisk 143. A pinion 144 is keyed on the shaft 142 and is intended to cooperate with the internal set of bevel teeth 139 once the stem 136 has been locked in position.

During operation, the rotational movement of the hand crank in the direction A is transmitted directly to the whisk support 137 which is rotationally coupled to the shaft 106 by reason of the hexagonal structure of the cavity 127 and of the stem 136. As a result of the action of the rotational locking device 146, the toothed ring 113 is not driven in rotation. Furthermore, if the internal teeth 139 tend to be set in rotational motion in the same direction A as a result of reaction against the motion of the pinion 144, said teeth tend to drive the countershaft 115 in the direction B by means of the pinions 118 and 117. In point of fact, as a result of the action of the one-way clutch device 156, this movement of rotation is prevented. The conical set of teeth 139 is therefore maintained stationary and the pinion 144 then carries out the same planetary movement as in the previous embodiment.

One advantage of this embodiment consists in a simplification of the conversion operations and the lid-plate 119 remains in position in both versions. On the other hand, the mechanical portion of the appliance is practically inaccessible for cleaning purposes.

Reference being made to FIGS. 9 to 15, a third embodiment of the invention will now be described. This embodiment can have two alternative forms having certain common features which are essentially illustrated in FIGS. 13 to 15.

A container 201 is provided in this example with a flat base which rests on the working surface by means of a simple bottom bead 261 (shown in FIG. 13), thus endowing the entire appliance with a greater degree of stability. A cup 262 having a convex bottom wall is formed at the center of a drying basket 221 and adapted to cooperate with a boss 263 of the base of the container 261, said boss being intended to form a pivot. The basket 221 also has a flat base or bottom wall which accordingly increases its capacity. On said bottom wall are fixed three legs 264 which are of greater length than the cup 262 but are sufficiently short to ensure that they do not come into contact with the bottom of the container 1 when the appliance is mounted in the spin-drier version. Said basket can therefore be placed on a working surface in a stable manner.

The respective cooperating edges 232 of the lid-plate 219 and 234 of the drying basket 221 are corrugated (as shown in FIG. 4) in a complementary manner so as to form castellated recesses having oblique sides. In the event of jamming of the hand crank or of the basket, an assembly of this type can readily be disengaged.

Figure 15:
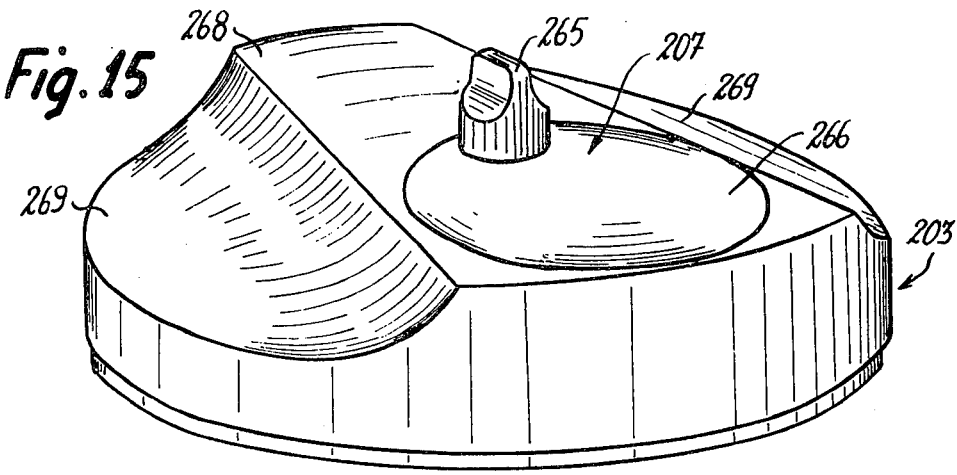
FIG. 15 is a view in perspective of the lid, this view being common to the two previous variants.

Finally, a hand crank 207 is provided with a crank handle 265 pivotally mounted on a crank-plate 266 which is flush-mounted within a lid 203 of the container 201 (as shown in FIG. 15). The shaft 267 (FIG. 9) of said crank-plate is located off-center with respect to the axis of the appliance, thus providing on the lid 203 a free zone 268 having a large area on which the user's hand can be applied, said zone being completed by hollowed-out portions 269 which afford an even more effective grip on the appliance.

Figure 9:
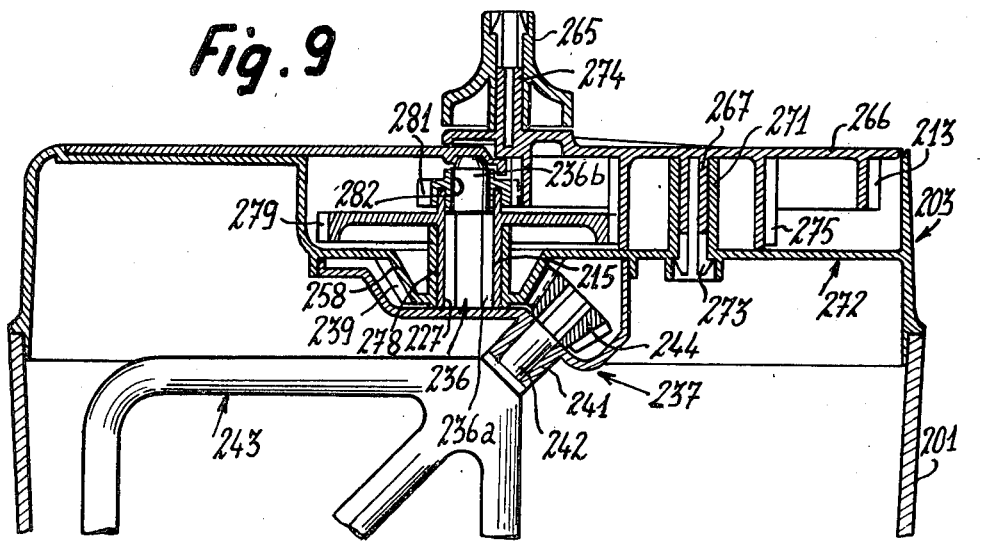

In a first variant of this third embodiment (as shown in FIGS. 9 and 10), the shaft 267 of the crank-plate 266 is carried by a bearing 271 which is made integral with a web 272, said web being in turn integral with the lid 203. The shaft 267 is locked axially within the bearing 271 by means of a resilient member 273 having slits and locking teeth. The same arrangement is applied to the axial locking of the crankhandle 265 on a shaft 274 carried by the crank-plate 266. The plate 266 carries a first toothed ring 213 of relatively large diameter and a second toothed ring 275 of distinctly smaller diameter, the ring 275 being greater in length than the ring 213.

The web 272 is provided in the axis of the appliance with a conical depression 258 provided with an external set of teeth 239 so as to form a bevel pinion which is stationarily secured against rotation. The web 272 is further provided with a bearing 278 which is coaxial with the appliance, a countershaft 215 being mounted for free rotational motion within said bearing. The countershaft 215 carries a large pinion 279 which meshes with the small toothed ring 275. A small pionion 281 is loosely mounted on said countershaft and disposed in meshing engagement with the large toothed ring 213. It is apparent that, from a structural standpoint, the shaft 215 is not a countershaft in the same sense as the shafts 15 and 115 of the previous embodiments but nevertheless performs a similar function. It is for this reason that the use of the term continues to be adopted in this embodiment and in the remainder of the description.

It is understood that, by reason of the fact that the pinion 281 is loosely mounted on the countershaft 215, the kinematic system thus described causes the pinion 279 to rotate at low speed and the pinion 281 to rotate at high speed when the hand crank 207 is actuated.

The pinion 279 has an axial cavity 227 of hexagonal cross-section and the pinion 281 has a similar cavity 282.

In the mixer version (shown in FIG. 9), the appliance is equipped with a mixing unit comprising a whisk support 237 which carries a stem 236 having a length such that this latter passes through both cavities 227 and 282 of the pinions 279 and 281. Along that portion 236a of the length of the stem which corresponds to the pinion 279, the stem 236 has a hexagonal cross-section which is complementary to the cavity 227 whereas, along that portion 236b of its length which corresponds to the pinion 281, said stem has a circular cross-section in order that it should not cooperate with the cavity 282. While being nevertheless removable, the portion 236a is intended to engage in the cavity 227 in a relatively tight fit so as to constitute an axial lock.

The whisk support 237 further comprises a bearing 241 which carries the shaft 242 of a whisk 243. On the shaft 242 is keyed a pinion 244 which is adapted to mesh with the bevel pinion 239 when the stem 236 is fully engaged within the cavities 227 and 282.

During operation and as a result of the action of the cooperating hexagonal portions, the pinion 279 drives the whisk support 237 in rotation at low speed, with the result that the pinion 244 runs on the bevel pinion 239 in a planetary movement, thus imparting the double movement of rotation and revolution described earlier to the whisk 243. At the same time, the pinion 281 rotates at high speed but does not drive any component by reason of the circular cross-section of the portion 236b of the stem 236.

FIG. 10 is a view of the spin-drier version, this view being taken in an axial plane at right angles to that of FIG. 9 in order to show the hollowed-out portions 269 of the cover 203. In this version, a lid-plate 219 is provided with a central stem 226 which is similar to the stem 236 and divided in the same manner into two lengths 226a and 226b but the cross-sectional profiles of these lengths are reversed with respect to those of the stem 236 inasmuch as the length 226a opposite to the pinion 279 has a circular cross-section whereas the length 226b opposite to the pinion 281 has a hexagonal cross-section in order to cooperate with the cavity 282 in a relatively tight fit but in a removable manner.

The lid-plate 219 cooperates with the edge 234 of the drying basket 221 in order to drive this latter in rotation by means of the corrugated sides described earlier.

During operation, the two pinions 279 and 281 again rotates simultaneously at low and high speeds respectively but the lid-plate 219 is driven at high speed as a result of hexagonal cooperation of the pinion 281 with the portion 226a of the stem 226 whereas the pinion 279 does not drive any component by reason of the non-cooperating circular cross-section of the portion 226b of the stem 226.

Referring to FIGS. 11 and 12, the second variant of the third embodiment of the invention will now be described.

The appliance further comprises a container 301 over which is placed a lid 303. Said lid 303 is fitted with a hand crank 307 composed in particular of a flush-mounted plate 366 and provided with a shaft 367 which is displaced offcenter with respect to the axis of the appliance. Said shaft is carried by a bearing 371 which is integral with a web 372, said web being in turn integral with the lid 303.

The crank-plate 366 also carries a toothed ring 313 of large diameter which is provided in this case with an internal set of teeth, and a toothed ring 375 of smaller diameter but of greater length than the ring 313.

A pinion 381 of small diameter is disposed in meshing engagement with the toothed ring 313 and keyed on a counter-shaft 315 carried by a bearing 378 which is rigidly fixed to the lid 303 and coaxial with the appliance.

A whisk support 337 comprises an axial sleeve 383 which is engaged for free rotational motion on the external wall of the bearing 378 and permanently locked in position axially by means of teeth 384 of said bearing. A bevel pinion 339 is mounted coaxially on the external wall of the sleeve 383 and continuously locked rotationally by means of a lug 385 which is integral with the web 372 and cooperates with a complementary recess of the pinion 339. The clearances of the teeth of the pinion 339 are closed at the top by means of retaining walls 386.

A pinion 379 of large diameter is fixed on the sleeve 383 so as to be freely rotatable with respect to the countershaft 315 and meshes with the small toothed ring 375.

The whisk support 337 further comprises a bearing 341 on which is rotatably mounted a pinion 344 disposed in meshing engagement with the bevel pinion 339 and pierced by an axial hexagonal cavity 387. The pinion 344 is held captive by the retaining walls 386. Finally, there is formed within the countershaft 315 an axial hexagonal cavity 327 terminating at the top in a circular enlarged portion forming an annular shoulder 388.

That portion of the equipment which is common to the two versions is limited to the assembly which has just been described.

In the spin-drier version (shown in FIG. 11), a lid-plate 319 carries an axial hexagonal stem 326 which is engaged within the cavity 327 in order to ensure that the lid-plate 319 is rotationally coupled with the countershaft 315. An elastic ring 328 fitted within a groove of the stem 326 is applied against the annular shoulder 388 so as to form an axial lock. The lid-plate 319 cooperates with a drying basket 321 as in the previous variant.

During operation, the two pinions 379 and 381 of the countershaft 315 are driven in rotation respectively at low speed and high speed by the toothed rings 375 and 313. This accordingly results in rotational motion of the whisk support 337 which causes displacement of the pinion 344 in planetary rolling motion on the bevel pinion 339 which is maintained stationary. However, the pinion 344 is not intended to carry any component. On the other hand, rotational motion of the countershaft 315 which is rigidly fixed to the pinion 381 directly initiates high-speed rotation of the stem 326 and of the lid-plate 319 and consequently the rotation of the drying basket 321.

In the mixing version (shown in FIG. 12), the lid-plate 319 and its stem 326 are withdrawn from the cavity 327. A mixing whisk 343 has a shaft 342 composed of a portion 342a of circular cross-section which is engaged within the bearing 341 and a portion 342b of hexagonal cross-section which is engaged within the hexagonal cavity 387 of the pinion 344. An elastic ring 389 fitted within a groove at the extremity of the portion 342b serves to lock the whisk 343 in the axial direction within the pinion 344, rigid rotational coupling of these two components being achieved as a result of their cooperating hexagonal shapes.

During operation of the appliance, the countershaft 315 does not drive any component and the pinion 344 drives the whisk 343 in the double movement of revolution and rotation described earlier.

In addition to the above-mentioned advantages of these two variants of the aforesaid third embodiment, the appliance has smaller overall dimensions, especially in height, since the countershaft has been brought back in the axis of the appliance and no longer takes up additional space, this arrangement being adopted in conjunction with the use of a double toothed ring on the hand crank..

Figure 16:
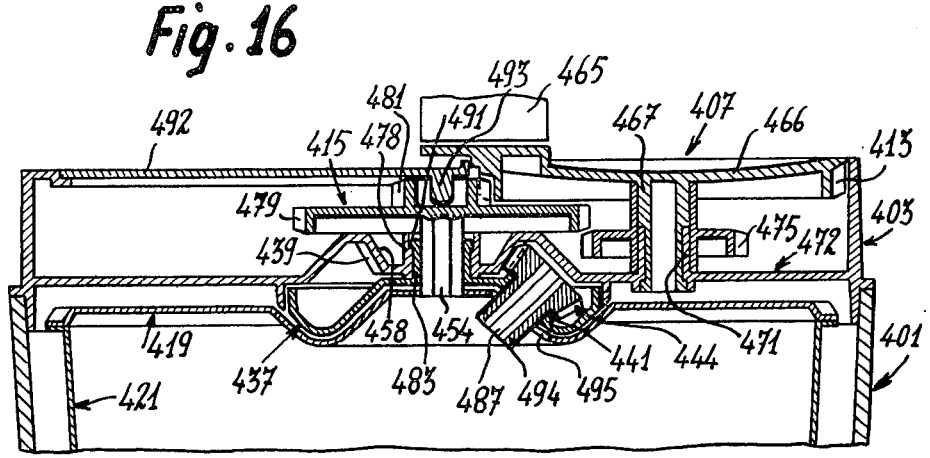
FIGS. 16 and 17 are partial sectional views of a fourth embodiment of the invention, respectively in the spin-drier version and in the mixer version.
Figure 17:
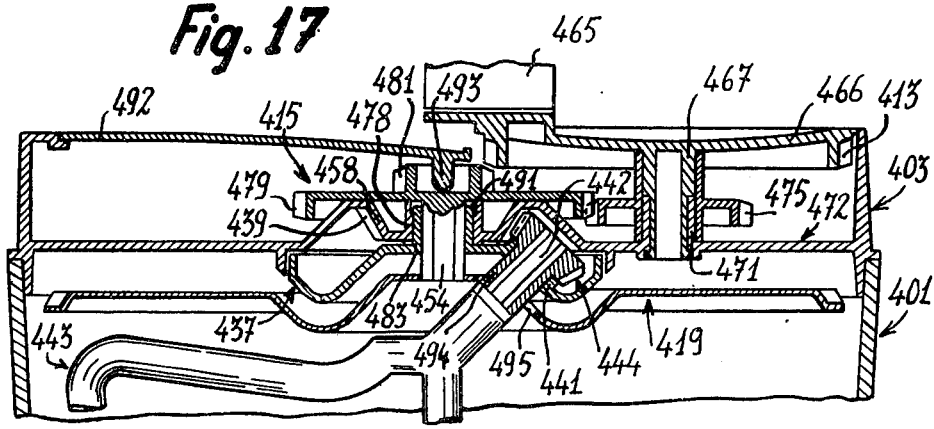

A fourth embodiment of an appliance in accordance with the invention will now be described with reference to FIGS. 16 and 17. Only the mechanical portion of the appliance will be described in this instance, it being understood that the bottom walls of the drying basket and of the lid can advantageously be identical with those of the previous embodiment and the same applies to the superstructures of the lid.

A container 401 is fitted with a lid 403 which carries the flush-mounted plate 466 of a hand crank 407. Provision is made at the center of the crank-plate 466 for a shaft 467 carried by a bearing 471 which is mounted off-center with respect to the axis of the appliance and integral with a web 472 which is in turn integral with the lid 403. The crankplate 466 also carries two toothed rings 413 and 475 having respectively a large and small diameter and displaced axially along the shaft 467.

A countershaft 415 which is coaxial with the appliance comprises a hexagonal stem 454 slidably mounted within a sleeve 483 of a whisk support 437. The sleeve 483 is carried by a bearing 478 which is integral with the web 472 and locked in the axia direction with respect to said bearing by means of projecting catches 491. At the upper end, the stem 454 is rigidly fixed to a small pinion 481 and to a large pinion 479 whilst the lower end of said stem is permanently attached to a lid-plate 419.

The length of the stem 454 is such that this latter is capable of displacement over a predetermined axial range of travel limited by the abutting application of the abovementioned end components of said stem. Moreover, said length is determined so as to ensure that, in the top position (shown in FIG. 16), the small pinion 481 engages with the large toothed ring 413 and that in the bottom position (shown in FIG. 17), the large pinion 479 engages with the small toothed ring 475. A leaf-spring 472 provided with a stud 493 and secured to the lid 403 produces action on the countershaft 415 in the axial direction in order to cause this latter to move to the bottom position (as shown in FIG. 17).

There is formed in the web 472 an axial circular depression having a conical portion 458 and this latter carries a set of teeth 439 which forms a fixed bevel pinion. 492

The whisk support 437 further comprises a bearing 441 adapted to carry a pinion 444 which is in mesh with the bevel pinion 439 and is imprisoned within the circular depression aforesaid. The pinion 444 has an extension 494 which traverses the lid-plate 419 through a hole 495 and is bored from one end to the other so as to form a hexagonal cavity 487.

The assembly which has just been described constitutes the equipment which is common to both the spin-drying and mixing versions.

In the spin-drying version (shown in FIG. 16), a drying basket 421 similar to those described earlier is placed within the container 401. By placing the lid 403 in position, the lid-plate 419 is applied against the basket 421, thereby lifting said lid-plate and upwardly displacing the countershaft 414 as a result of withdrawal of the leaf-spring 492. The pinion 481 then engages with the toothed ring 413 whilst the pinion 419 is disengaged from the ring 475.

The movement of rotation of the hand crank 407 then causes high-speed rotation of the countershaft 415 and, correlatively, of the lid plate 419 and of the drying basket 421.

In the mixing version (shown in FIG. 17), the basket 421 being removed, the countershaft 415 returns to its bottom position under the action of the leaf-spring 492. A hexagonal shaft 442 of a mixing whisk 443 is inserted into the hexagonal cavity 487 with relatively strong friction in order to achieve axial locking.

By reason of the low position of the countershaft 415, the pinion 481 is disengaged from the toothed ring 413 whilst the pinion 479 disengages from the toothed ring 475. The shaft 415 then drives the whisk support 437 at low speed by means of the hexagonal stem 436, thus causing the pinion 444 to run over the bevel pinion 439 and initiating the double movement of rotation and revolution of the whisk 443.

In this embodiment, the mechanism is simplified but the operation of the appliance requires to be performed with care.

A fifth embodiment of the invention will now be described with reference to FIGS. 18 to 24.

Referring first to FIG. 18 which shows the two mixing and spin-drying versions in graphic superposition, the appliance comprises a container 501 which is similar to that described in the previous embodiments, this container being provided with three bearing pads 502 of non-slip material inserted at uniform intervals within a circular groove 502a. Said container is covered with a lid 503 in which is flushmounted the plate 566 of a hand crank 507 fitted with a crank handle 565.

The crank-plate 566 is provided with a central shaft 565 carried by a bearing 571 which is located off-center with respect to the appliance and integral with a web 572 which is in turn integral with the lid 503. The crankplate 566 carries a large toothed ring 513 and a small toothed ring 575. For reasons relating to convenience of manufacture, the rings shown in the drawings do not form a single-piece assembly with the crank-plate 566 but these components are assembled together in a permanent manner.

A countershaft 515 fitted with a large pinion 579 keyed on this latter is carried by an axial bearing 578 which is integral with the web 572, the pinion 579 being disposed in meshing engagement with the small toothed ring 575.

A lid-plate 519 is provided at its center with a sleeve 583 which is rotatably mounted around the bearing 578. Above the lid-plate 519, the sleeve 583 is provided with a set of teeth so as to constitute a pinion 581 which can be considered as loosely mounted on the countershaft 515 and which engages with the large toothed ring 513.

The lid-plate 519 is provided in the central portion thereof with a dome 519a which extends over approximately one-half its diameter. Beneath this dome, a bevel pinion 539 comprising a sleeve 539a is mounted for axial sliding motion on the external wall of the bearing 578 but locked rotationally with respect to said bearing as a result of cooperation of hexagonal sections (as shown in FIG. 23).

A whisk support 537 having a generally flat shape is placed in such a manner as to substantially close the dome 519a and carries a central hexagonal rod 536 which is slidably mounted within a complementary hexagonal cavity 527 of the countershaft 515. The rod 536 has a split head 596 (as shown in FIG. 21) in which is formed an annular groove 596a, said groove being intended to cooperate with a bead 596b formed in the bore of the shaft 515 and to produce axial locking of said rod.

The sleeve 539a of the bevel pinion 539 is clamped axially between the sleeve 583 and the whisk support 537 and is provided with a circular groove in which are engaged arcuate claws 597 which are integral with the support 537 (as shown in FIGS. 22 and 23) in order to provide axial but not rotational coupling between the support 537 and the pinion 539.

The whisk support 537 further comprises a bearing 541, there being mounted on the external wall of said bearing a pinion 544 which is in mesh with the bevel pinion 539 (as shown in FIG. 22). The pinion 544 is imprisoned by retaining walls 586 which close the tooth clearance of the bevel pinion 539. Finally, the pinion 544 is bored from one end to the other so as to form a hexagonal cavity 587.

The lid 503 is fitted with a flush-mounted flexible strip 598 having a knurled portion 598a, the extremity 598b of which can be applied against the head 596 of the stem 536 under a suitable pressure in order to cause axial unlocking of said stem with a view to carrying out the disassembly of the appliance.

The equipment which has just been described constitutes the portion which is common to the spin-drying and mixing versions.

In the spin-drying version, a drying basket 521 which can advantageously be identical with the basket described with reference to FIG. 13 is placed in position and cooperates in rotational motion with the lid-plate 519 by means of a corrugated-surface arrangement (as shown in FIG. 24). In accordance with this arrangement, recesses 532a and 534a of castellated cross-section are formed respectively in the cooperating edges 532 and 534 of the lid-plate 519 and of the drying basket 521. Said castellated recesses form a corrugated profile, have the same relative spacing on each of said edges and are directed towards each other in mutual relation. The spacing of said recesses is considerably greater than the width of a single castellation, with the result that there is little likelihood of two recesses 532a and 532b coming into position opposite to each other at the time of positioning. Should this occur, said recesses slide readily over each other so as to come into the position indicated in FIG. 24.

During operation, the actuation of the hand crank initiates rapid rotation of the lid-plate 519 by means of the large toothed ring 513 and the pinion 581 and said lid-plate in turn drives the drying basket 521. At the same time, the countershaft 515 is driven in rotation at low speed by means of the small toothed ring 575 and the large pinion 579, thus producing the low-speed rotation of the whisk support 537 to which said countershaft is rigidly fixed. The pinion 544 then runs in a planetary movement on the pinion 539 which is maintained stationary. However, no component is driven by said pinion 544.

In the mixing version, a whisk 543 is engaged by means of a cylindrical portion 542a of its shaft 542 within the bearing 541 of the whisk support 537, a hexagonal portion 542b of said shaft being intended to cooperate with the hexagonal cavity 587 of the pinion 544 (as shown in FIG. 22). An elastic ring 589 fitted within a groove at the extremity of the portion 542b achieves axial locking of the whisk 543 with the pinion 544, these two components being made fast for rotation by means of the corresponding hexagonal shapes. Moreover, in this version, the drying basket 521 is withdrawn. It should also be noted that, by reason of their respective overall size, the drying basket 521 and the whisk 543 cannot be mounted in position at the same time (as shown in FIG. 18).

During operation, the planetary movement of the pinion 544 causes the whisk 543 to be driven in a double movement of rotation about its own axis and of revolution about the axis of the appliance. At the same time, the lid-plate 519 rotates at high speed but does not drive any component.

In the embodment herein described, the gear ratios are such that the lid-plate 519 (and therefore the drying basket) rotates at approximately 7.5 times the speed of the whisk support 537 in respect of an equal speed of the hand crank. On the justifiable assumption that the user is recommended to rotate the hand crank at a speed for the spin-drying operation which is twice the speed adopted for the mixing operation, the ratio of speed of spin-drying by centrifugation to speed of revolution of the whisk is in that case approximately 15:1. In more precise terms and postulating respective speeds of the hand crank of approximately 120 rpm and 60 rpm, there is accordingly obtained a spin-drying speed of approximately 450 rpm and a speed of revolution of the whisk of approximately 30 rpm. Furthermore, the speed of rotation of the whisk about its own axis is approximately twice its speed of revolution. These values are obviously given only by way of example.

It is thus particularly remarkable to obtain in a single appliance and by means of partially common mechanical elements a spin-drying speed of sufficiently high value to obtain effective drying and a mixing speed of sufficiently low value to prevent any dilaceration of food products.

For the purpose of cleaning the appliance, the mechanism can be partly disassembled (as shown in FIG. 19) by exerting pressure on the knurled portion 598a of the flexible strip 598, the extremity 598b of which is brought to bear on the split head 596 of the stem 536 and causes disengagement of the groove 596a from the bead 596b. Said stem then slides within the cavity 527, thus releasing the whisk support 537 to which said stem is rigidly fixed; the support carries with it the bevel pinion 539 which is slidably mounted on the bearing 578 and rigidly fixed to the support 537 by means of the claws 597. The pinion 544 which is held captive by the retaining walls 586 of the pinion 539 cannot be mislaid.

The sleeve 583 of the lid-plate 519 is in that case no longer retained by the pinion 539, with the result that said lid-plate 591 can also be withdrawn. Washing of the mechanism which has remained in position can readily be performed through the various openings in the web 572. It should in any case be observed that such a washing operation is seldom necessary since projections of seasoning can practically not reach this portion of the appliance which is permanently protected by the lid-plate 519.

Even more complete disassembly can be carried out by disengaging the bevel pinion 559 from the claws 597, thus releasing the pinion 544.

It can be ascertained from the study of FIG. 18 that the general arrangements described in connection with the lid-plate 519 and the whisk support 537 provide utilizable space which is limited at the top by a substantially flat or slightly concave surface except for the projecting portion corresponding to the bearing 541, thereby improving the capacity of the appliance.

With reference to FIGS. 25 to 27, two examples of construction of the mixing whisk will now be described.

Referring first to FIG. 25, a whisk 643 comprises a shaft 642 which is in turn composed of a cylindrical portion 642a and of a hexagonal portion 642b which is adjacent to a head 642c of said shaft. The portion 642a is so arranged as to cooperate with a bearing such as the bearing 541 of the last embodiment described above and the portion 642b is adapted to cooperate with a hexagonal cavity such as the cavity 587 of the pinion 544 (as shown in FIG. 22).

The head 642c is split so as to have two relatively flexible arms each provided with a bead 642b which is adapted to cooperate with a complementary groove formed in a pinion such as the pinion 544.

At the end remote from the head 642c, a flat paddle element 698 is fixed in the shaft 642. Said paddle has fingers 698a to 698e which are arranged in a dissymmetrical manner. The arrangement of these fingers depends essentially on the shape of the container in which they are intended to operate. In the example herein described, said container is the container 501 (as shown in FIG. 18). The fingers 698a to 698c located on the right-hand side of the whisk shaft in the figure are respectively perpendicular to the shaft and at angles of 60° and 40° with respect to this latter. The fingers 698d and 698e which are located on the left-hand side of the figure are inclined with respect to said shaft at angles of 45° and 75° respectively. The respective lengths of the fingers are so determined as to ensure that, during operation of the appliance, the ends of said fingers pass as close as possible to the base of the container on which they are mounted, namely in this case the container 501.

This type of whisk permits of excellent stirring of the entire mass which is present within the container without leaving any unstirred zone. As stated earlier, it is nevertheless necessary to ensure that the number of teeth of the whisk pinion and of the bevel pinion are in a ratio which is different from unity.

If this condition cannot be satisfied on account of various technical requirements, it will be preferable to adopt a whisk in accordance with the design which will now be described with reference to FIGS. 26 and 27. A whisk 743 has a shaft 742, said shaft being in turn made up of a cylindrical portion 743a and of a hexagonal portion 742b which are similar to the elements of the whisk 642 as described earlier. Similarly, the shaft 742 has a head 742c which is similar to the head 642c.

In the end of the shaft 742 opposite to the head 742c are inserted three paddles 798 which are relatively displaced substantially at angular intervals of 120° with respect to the center-line 799 of the shaft 742. In the example herein described, said paddles are each constituted by a stainless steel rod bent into a general shape which is similar to that of a right-angled triangle, the hypotenuse of which coincides approximately with the line 799. It is apparent, however, that this form of construction is only one particular example.

The advantage of this form of construction of the whisk lies in the fact that effective stirring is ensured even when the ger ratios are such that the whisk returns exactly to the same position at each revolution.

It is apparent that the invention is not limited to the embodiments hereinabove described. Apart from alternative forms of construction which are within the capacity of anyone versed in the art, it would be possible by way of example and without departing from the scope of the invention to devise alternative forms in which the feature described in the foregoing in connection with separate embodiments could be combined. Thus the different forms of construction of the whisk of the container and of the drying basket could be combined with the different forms of construction of the mechanism. Again within the scope of the invention, it would be possible to design the driving crank so that this latter can be actuated automatically by any suitable device such as an electric motor.

We claim:

1. A domestic appliance for conditioning food and especially food in the form of leaves such as salads, comprising a container fitted with a lid for carrying an actuating hand-crank on which is keyed a toothed ring, wherein said appliance comprises in combination a spin-drying unit composed of a removable drying basket driven in rotation by a lid-plate, complementary pivotal means being provided respectively at the center of the basket and at the center of the container, and a mixing unit which is at least partially removable, and wherein said appliance comprises means for providing a mechanical coupling between said units and the hand-crank, said coupling means comprising a countershaft having two pinions for driving either one of said two units, the mixing unit comprises a whisk mounted for rotation about its axis and carried by a whisk support which is in turn rotatably mounted on the lid of the appliance, said mechanical coupling means comprising a pinion keyed coaxially with the whisk and so arranged as to cooperate in planetary motion with a bevel pinion which is substantially coaxial with the appliance and fixed rotationally with respect to the lid in order to ensure both rotational motion of the whisk about its axis and rotational motion of said axis along a conical path, the hand-crank being located off-center with respect to the axis of the appliance, said hand-crank having a second toothed ring having a diameter which is different from the first, said toothed rings being so arranged as to engage with the pinions of the countershaft, said countershaft being substantially coaxial with the appliance, and the bevel pinion being permanently fixed on the lid of the appliance at least during normal operation.

2. An appliance according to claim 1, wherein the whisk pinion is permanently fixed in the whisk support which is in turn permanently fixed on the lid of the appliance, wherein the whisk is removable and comprises means for rotational coupling and for axial locking with said pinion, wherein the lid-plate is rigidly fixed to the countershaft which is in turn rotationally coupled with the whisk support, wherein the two pinions of the countershaft are keyed on said shaft, and wherein said shaft is mounted for axial sliding motion in order to selectively dispose one of said pinions in meshing engagement with one of the toothed rings of the hand crank, means for controlling said axial sliding motion being constituted by a leaf-spring secured to the lid and by the presence of the drying basket.

3. An appliance according to claim 1, wherein one of the pinions of the countershaft is loosely mounted on said shaft, the other pinion being keyed on said shaft and both pinions being continuously in mesh with the respective toothed rings of the hand crank.

4. An appliance according to claim 3, wherein the lid-plate is removable by axial translational motion and comprises means for rotational coupling with the smallest pinion of the countershaft.

5. An appliance according to claim 4, wherein the whisk support is removable and comprises means for rotational coupling and axial locking with the countershaft, the pinion which is loosely mounted on said shaft being the smaller of the two 6. An appliance in accordance with claim 4, wherein the whisk support is permanently fixed on the lid of the appliance at least during normal service and is rigidly fixed to the largest pinion which is mounted on the countershaft, said pinion being loosely mounted on the shaft, the whisk pinion being in turn permanently attached to the support, wherein the whisk is removable and wherein the whisk shaft comprises means for rotational coupling and axial locking with the whisk pinion.

7. An appliance according to claim 3, wherein the lid-plate is permanently attached to the lid of the appliance at least during normal service and is rigidly fixed to the pinion which is loosely mounted on the countershaft, wherein the whisk support is also attached to the lid of the appliance during normal service and rigidly fixed to the countershaft, wherein the whisk is removable and wherein the whisk shaft comprises means for rotational coupling and axial locking with the whisk pinion.

8. An appliance according to claim 7, wherein the lid comprises an axial bearing in which the countershaft is mounted and around which is mounted the loose pinion which is rigidly fixed to the lid-plate.

9. An appliance according to claim 8, wherein the bevel pinion is mounted for sliding motion around said bearing and is locked rotationally with respect to said bearing.

10. An appliance according to claim 9, wherein the bevel pinion is secured axially to the whisk support by means of claws carried by said support and adapted to cooperate with an annular groove formed in said pinion.

11. An appliance according to claim 10, wherein the whisk support comprises means for rotational coupling and axial locking with the countershaft.

12. An appliance according to claim 11, wherein said appliance comprises means for releasing the axial locking system aforesaid in order to carry out complete disassembly for thorough cleaning and wherein said means comprise a thrust member formed by a flexible strip of the lid.

13. An appliance according to claim 12, wherein the set of teeth of the bevel pinion is closed on one side by retaining walls for imprisoning the whisk pinion at the time of disassembly operations.

14. An appliance according to claim 7, wherein the lid-plate is provided in the central portion thereof with a dome in which the gear system of the whisk is housed, said dome being closed at the bottom portion thereof by the whisk support.

15. An appliance according to claim 14, wherein the assembly consisting of the lid-plate and the whisk support has a substantially continuous and generally concave surface towards the bottom of the container.

16. An appliance according to claim 1 in which the drying basket is mounted for axial pivotal motion within the container by means of respective cooperating portions, wherein the drying basket comprises supporting legs having a length greater than the cooperating portion of the basket and shorter than the distance between the basket and the bottom of the container when said basket is mounted within said container.

17. An appliance according to claim 1, wherein the respective dimensions of the whisk and of the drying basket are such that it is impossible to place the lid in position when the whisk is mounted on the reduction-gear system and the drying basket is mounted at the same time within the container.

18. An appliance according to claim 1, wherein the ratio of the number of teeth of the bevel pinion to the number of teeth of the pinion which is coaxial with the whisk is not an integer.

19. An appliance accordance to claim 1, wherein the mixing whisk has fingers which are located in a plane passing substantially through the axis of rotation of the whisk and arranged in a dissymmetrical manner with respect to said axis.

20. An appliance according to claim 1, wherein the mixing whisk comprises three curved elements located respectively in planes which pass substantially through the axis of rotation of the whisk, said planes being disposed in a uniform angular distribution about the axis of rotation.

21. An appliance according to claim 1, wherein the means for rotationally coupling the lid-plate with the drying basket comprise bosses arranged at intervals on a flange of the drying basket, said bosses cooperating with lugs which are cut out in the lid-plate, the flexibility of the lid-plate being sufficient to compensate for initial faulty positioning of the lid-plate with respect to the drying basket.

* * * * *